United States Patent [19]

Babak

[11] Patent Number: 4,570,510
[45] Date of Patent: Feb. 18, 1986

[54] GEARING MECHANISM, PARTICULARLY FOR SEAT WITH ADJUSTABLE BACK REST

[75] Inventor: Jan Babak, Mlada Boleslav, Czechoslovakia

[73] Assignee: Automobilove Zavody, narodni podnik, Mlada Boleslav, Czechoslovakia

[21] Appl. No.: 554,252

[22] Filed: Nov. 22, 1983

[30] Foreign Application Priority Data

Nov. 25, 1982 [CS] Czechoslovakia ............... 8468-82

[51] Int. Cl.⁴ .................... F16H 1/28; F16H 55/17
[52] U.S. Cl. ................................ 74/805; 74/803; 74/435
[58] Field of Search .......... 74/804, 805, 803, 435; 297/370, 371, 266, 267; 29/159.2; 72/325, 326

[56] References Cited

U.S. PATENT DOCUMENTS

| | | | |
|---|---|---|---|
| 2,797,589 | 7/1957 | Chaveneaud | 74/435 X |
| 2,888,833 | 6/1959 | Toderick | 74/435 X |
| 3,673,891 | 7/1972 | Pickles | 74/804 |
| 4,020,717 | 5/1977 | Johnson | 74/804 |
| 4,184,714 | 1/1980 | Courtois | 297/370 |
| 4,225,182 | 9/1980 | Werner | 74/805 X |
| 4,371,207 | 2/1983 | Wilking et al. | 74/804 X |
| 4,457,556 | 7/1984 | Klingelhöfer | 74/805 X |
| 4,469,375 | 9/1984 | Boyer | 74/805 X |
| 4,469,376 | 9/1984 | Pelz | 74/804 X |

FOREIGN PATENT DOCUMENTS

| | | | |
|---|---|---|---|
| 2424042 | 1/1975 | Fed. Rep. of Germany | 74/805 |
| 575110 | 2/1946 | United Kingdom | 74/435 |
| 1237796 | 6/1971 | United Kingdom | 74/804 |
| 0650847 | 3/1979 | U.S.S.R. | 74/804 |

*Primary Examiner*—Leslie A. Braun
*Assistant Examiner*—Dirk Wright

[57] ABSTRACT

Gearing mechanism particularly for changing the relative angular position of two parts. A crown or ring gear with internal toothing is pressed from a sheet forming one arm, and a spur gear with external toothing is pressed from a sheet forming a second arm. The connection between the first arm and a hub of the crown gear and between the second arm and the spur gear is accomplished by bridges formed at tooth gaps of a width of at least of one pitch of the toothings. The mechanism can be used with collapsible seats of vehicles, for head rests, for the raising and lowering of windows, in textile machines, childs' vehicles, in furniture, agricultural machines, and the like.

3 Claims, 7 Drawing Figures

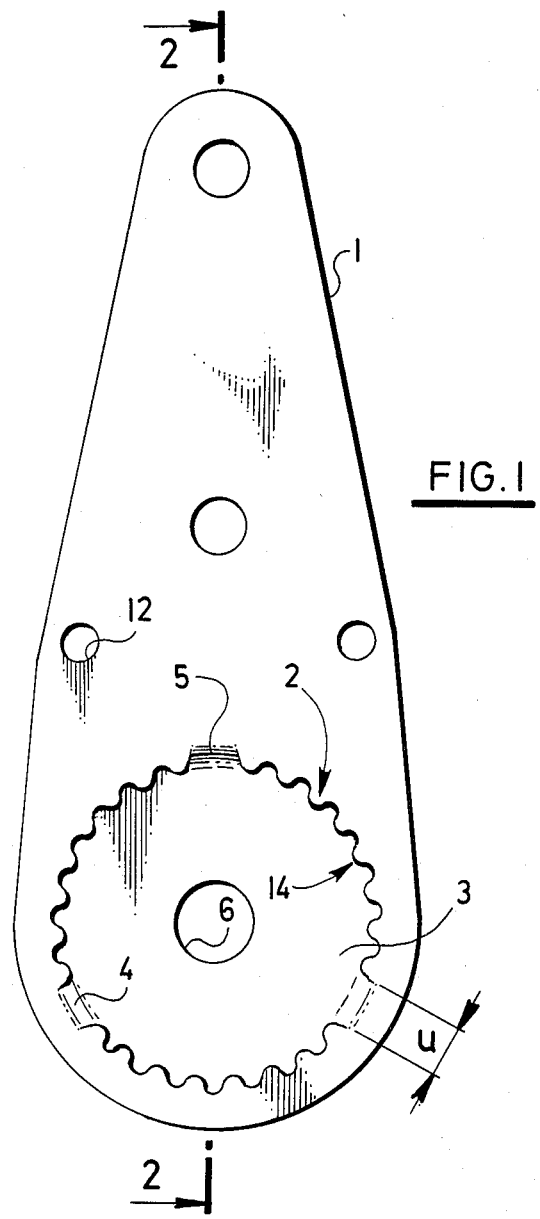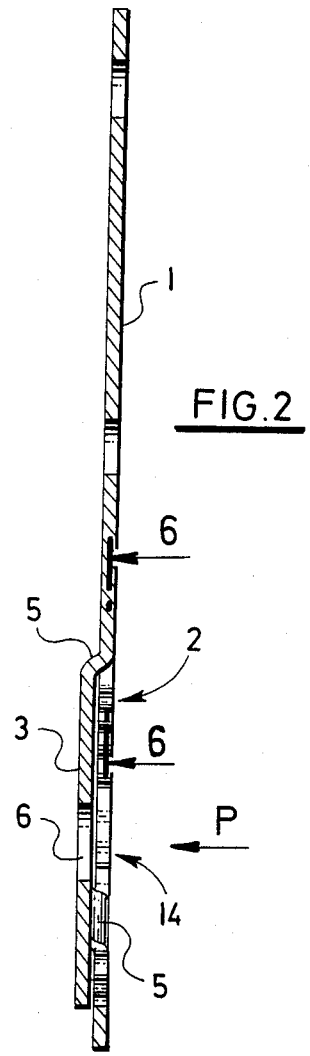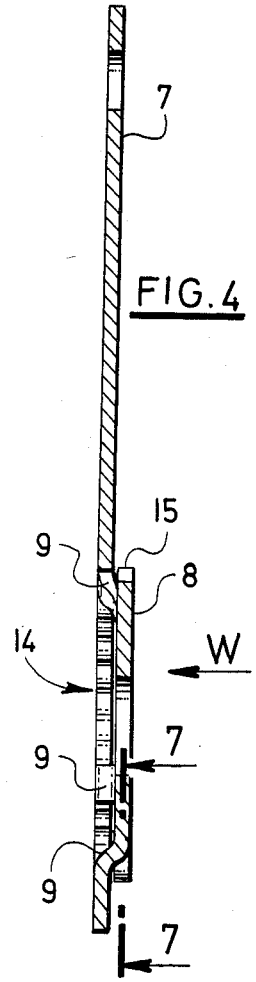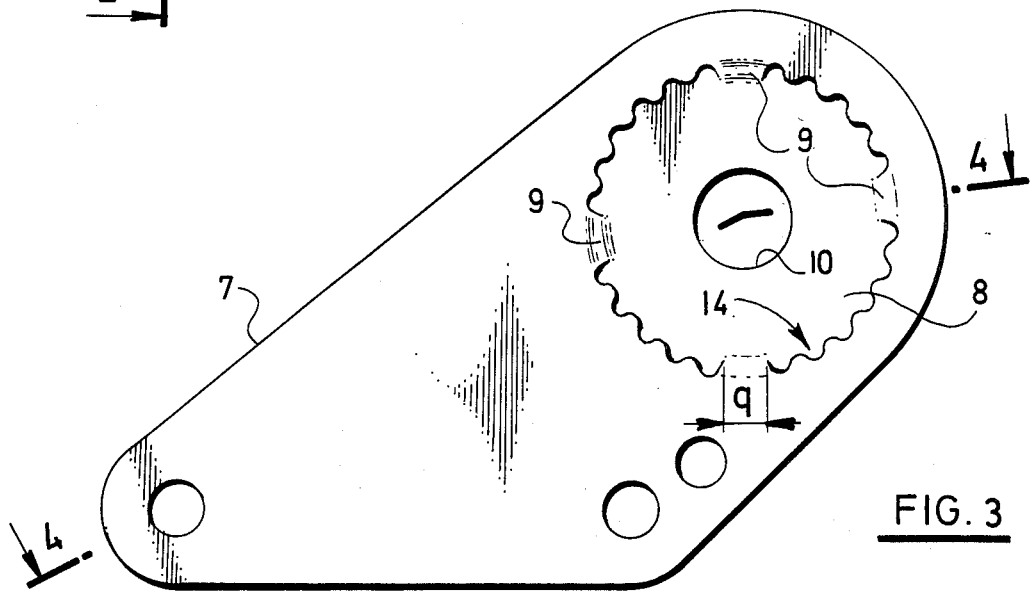

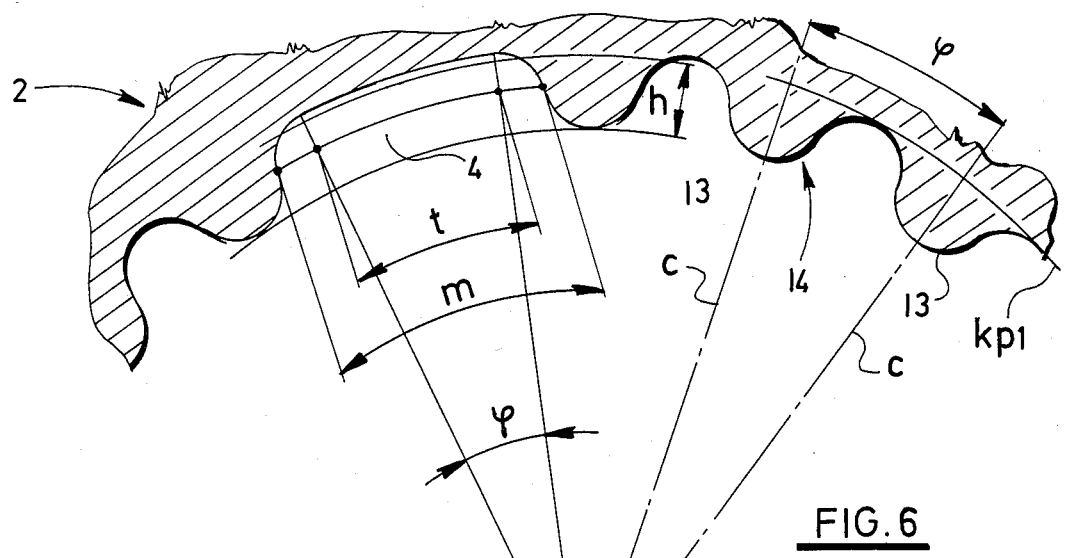
FIG. 6
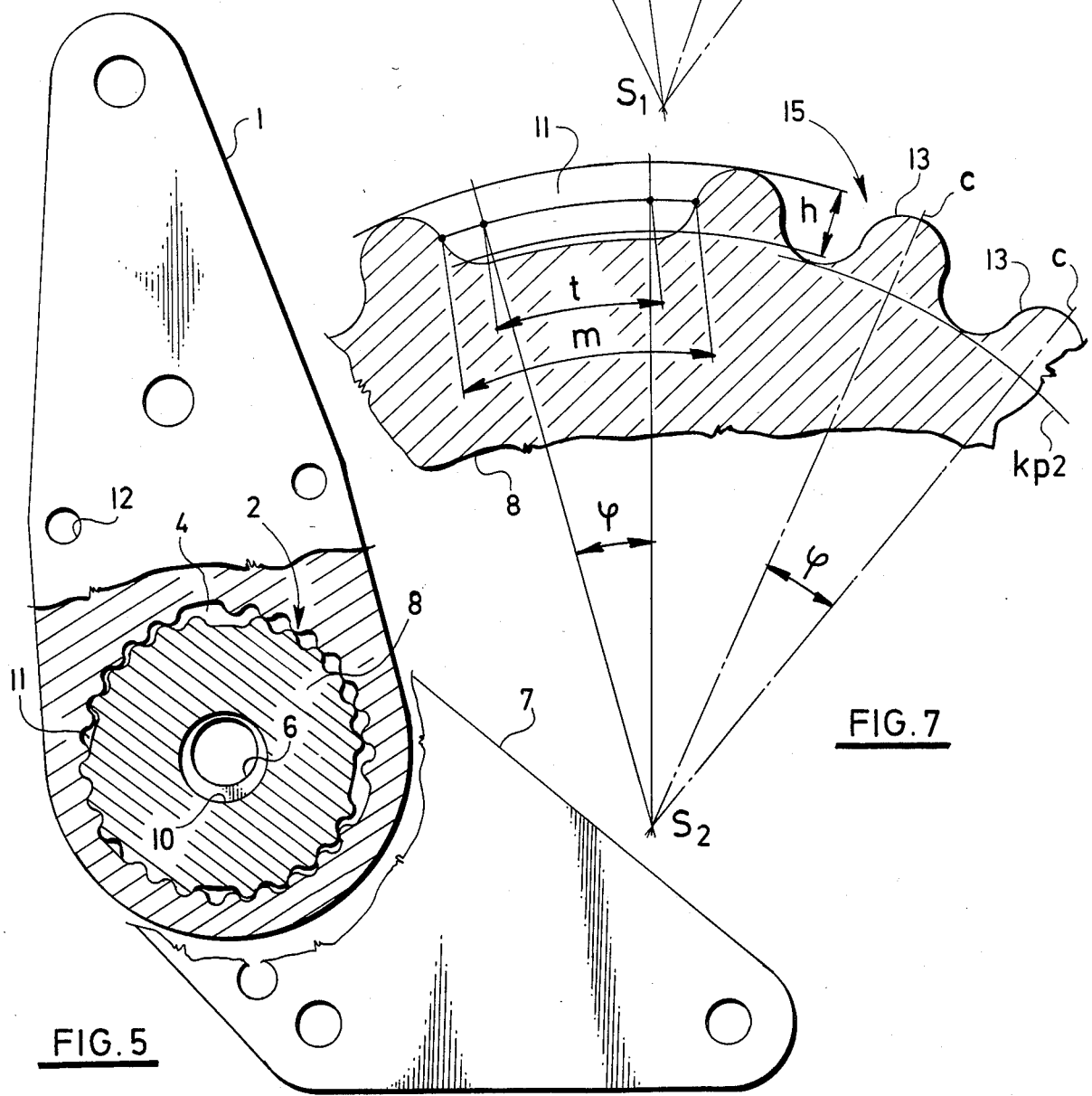
FIG. 7
FIG. 5

GEARING MECHANISM, PARTICULARLY FOR SEAT WITH ADJUSTABLE BACK REST

This invention relates to a gearing mechanism, adapted for determining the relative position of two parts, an internal gear of such mechanism forming a unit with one arm thereof, a spur gear forming a unit with a second arm of the mechanism. By turning of the carrier of the spur gear, a relative angular displacement of the two arms is achieved. The gearing mechanism of the invention is particularly suitable for adjusting collapsible seats, head rests, and for use in adjustable devices for raising the windows of motor vehicles.

Known gearing mechanisms, wherein a ring gear and a spur gear meshing therewith are made always of one piece with arms, are manufactured by a special technique requiring accurate gear cutting. The transmission of the load from the arms to the gears which form the unit therewith is accomplished by means of bridges which are created in the course of pressing of the gears along the circumference of the teeth thereon. The thickness of the sheet of the arm depends with this kind of design on the dimensions of the bridge and on the required width of the teeth of the gears. This is limited not only by considerations of strength of the parts, but also by the requirement of preventing any axial disengagement of the teeth in the case of transmission of a force. This danger is also imminent, since due to the technology of forming of the gears, a contraction of the material from which the gears are formed takes place at the circumferential parts of the toothing of the gears, whereby it is impossible to utilize the full width of the toothing at these places.

An increase of the required width of the toothing with the size of the bridge determined by strength considerations, leads thereby to an increase of the thickness of the arm. This results in a useless increase of the weight of the whole mechanism, and a useless overdimensioning of the parts from the point of view stress resistance.

Another known design of the interconnection of the gear with the arm is one in which the dimension of the bridge is reduced to zero and the transmission of the load to the gear is accomplished by means of radial supporting sections, obtained by a conical recess at places below each tooth gap, so that a narrow supporting bridge of triangular shape is formed on the other side of the arm, such bridge connecting each tooth with the arm. These narrow bridges are not advantageous from the point of view of stress resistance, since in addition to shearing stress, an additional bending stress is generated at the roots of the teeth of the gears. The requirement of a recess of the already narrowed tooth gap leads to sharper shapes of the tooth profile at the root thereof, and to unfavorable internal head angles and small radii of curvature. Such parameters increase not only demands on the properties of the material used in making an arm and a gear, but also on the manufacture of the tools employed to press such parts, thereby reducing their useful life.

The present invention has among its objects the elimination or at least the substantial reduction of the above-outlined drawbacks of the prior art, and to provide a gearing mechanism for the described purposes, which permits a substantial reduction of the thickness of the arms and thus reduces the weight of the gearing mechanism, while permitting the use of gear teeth which can be more effectively manufactured. According to this invention, the toothing of the ring gear and/or the toothing of the spur gear is provided within a row of teeth with at least one tooth gap, the width of which at the operating diameter of the height of the teeth is equal to or larger than the pitch of the toothing measured at the same diameter, determined by the pitch angle between the axis of symmetry of two adjacent teeth which are not adjacent to the tooth gap. In the place of this increased tooth gap, supporting bridges for the hub or for the spur gear respectively are created. The supporting bridge of the hub is provided by an axially bent part of the arm which is located above the root circle of the internal toothing, and the supporting bridge of the spur gear is provided by an axially bent part of the arm below the root circle of the external toothing of the spur gear.

By the provision of supporting bridges in the shape of axially bent material of the arms at the places of increased tooth gaps of the internal toothing of the ring gear and of the external toothing of the spur gear, a substantial reduction of the thickness of the arm, and thus also a reduction of the overall weight of the gearing mechanism is achieved. The reduction of the thickness of the arm and rounded shapes of cut parts, particularly if a trochoid toothing is used, have furthermore a favorable influence on the prolongation of the effective life span of the press tools which are used in forming the parts of the gearing mechanism.

An exemplary embodiment of the gearing mechanism according to this invention is shown in the attached drawings, wherein:

FIG. 1 is a view in elevation of a first arm of the gearing mechanism of the invention, such arm being provided with a crown or ring gear with internal toothing, the view being taken in the direction of the arrow "P" shown in FIG. 2;

FIG. 2 is a view in longitudinal central section through the first arm of the gearing mechanism, the section being taken along a plane in FIG. 1 by the line 2—2;

FIG. 3 is a view in elevation of the second arm of the gearing mechanism of the invention, such second arm being provided with a spur gear with external toothing, the view being taken in the direction of the arrow "W" in FIG. 4;

FIG. 4 is a view in longitudinal section through the second arm and spur gear, the section being taken along a plane indicated by the line 4—4 in FIG. 3;

FIG. 5 is a view partially in elevation and partially in section of the gearing mechanism of the invention as applied on an adjustable joint of a seat rest, the parts of the toothing of the gearing mechanism being shown in section:

Fig. 6 is a fragmentary view in section of the crown or ring gear of the gearing mechanism with the internal toothing thereof as shown in FIG. 2 being shown on an increased scale, the section being taken along a plane indicated by the line 6—6 in FIG. 2; and FIG. 7 is a fragmentary section of elevation of the spur gear with external toothing as shown in FIG. 4 but on a larger scale, the section being taken along a plane indicated in FIG. 4 by the line 7—7.

Turning first to FIGS. 1 and 2, there are there shown the first arm 1 of the gearing mechanism, such arm being provided with a crown or ring gear 2 having internal toothing 14 and a hub 3 formed by pressing the hub from a sheet of metal beyond the plane of the first arm 1. An opening 6 is provided in the hub 3 for reception of a pin of the spur gear carrier. The connection of the hub 3 with the first arm 1 is accomplished by means of supporting bridges 5 obtained by the axial bending of part of the material of the arm 1 at places where an increased gap 4 is provided between successive teeth. The increased tooth gap 4 is provided at least at one place on the internal toothing 14 of the crown gear 2. Gap 4 has within the zone of the working height h (see FIGS. 6 and 7) a width of m, which is equal to or larger than the pitch t of the toothing 14 measured at the same diameter. The pitch t is determined by the pitch angle between the axis c of symmetry of two adjacent teeth 13 which are not adjacent to the tooth gap 4.

The axis c of symmetry passes through the center $S_1$ of the crown gear 2, and possibly also through the center $S_2$ of the spur gear 8. The increased tooth gaps 4, 11 of the required width m are obtained by ommision of one or more teeth of the external toothing 15 of the spur gear 8 or of the internal toothing 14 of the crown gear 2. From a diagram of the lateral clearance of the trochoid toothing it follows that with the absence of some teeth of the external or internal toothing, practically no influence on the magnitude of the lateral backlash is experienced since the stress is transmitted automatically on another meshing pair of teeth. Due to the actual geometry and configuration of the toothing, this need not be the adjacent tooth. In order to maintain the character of the relative circular rolling movement, it is kinematically sufficient, if at least three teeth are at suitable pitches in engagement, which is also a limiting condition for utilizing the gearing mechanism of the invention.

The supporting bridge 5 of the hub 3 has a width u, and in order to prevent any collision with the material of the teeth of the spur gear 8, the axially bent arms forming the supporting bridges 5 are situated above the root circle $k_{p1}$ (see FIG. 6) of the internal toothing 14 of the crown gear 2.

As the internal toothing 14 of the crown gear 2 is pressed directly in the first arm 1, the supporting bridges 5 transmit to the hub part 3 only a part of the stress. In case a further covering sheet with concentrically situated support for the pin of the carrier of the spur gear is riveted to the first arm 1 in opening 12, this covering sheet equally transmits the same kind of stress as the supporting bridge 5. It is thus possible, with such construction, to reduce the thickness of the first arm substantially, while using a minimum number of increased tooth gaps 4 and of supporting bridges 5.

FIGS. 3 and 4 illustrate the second arm of the gearing mechanism of the invention, such second arm 7 being provided with a spur gear 8 with external toothing 15. The spur gear 8 is pressed from a sheet of metal beyond the plane of the second arm 7 and is provided in its central part with an opening 10 for the carrier of the spur gear 8. The connection of the second arm 7 with the spur gear 8 is accomplished by means of supporting bridges 9 obtained by the axial bending of the material of the second arm 7 at places of increased tooth gaps 11. In a manner similar to that of the supporting bridges 5 of the hub 3, where it is necessary to prevent any collision with the material of teeth of the crown gear 2, the axially bent arm of the supporting bridges 9 are of a width g below the root circle $k_{p2}$ (see FIG. 7) of the external toothing 15 of the spur gear 8.

FIG. 4 shows an arrangement of the second arm 7 with so-called negative bridges, the extent of the depth of the pressing of the spur gear 8 in the second arm 7 being larger than the thickness of the arm. This arrangement is, however, possible with spur gears 8 with external toothing only in case of favorable stress conditions, since contrary to supporting bridges 5 of the hub 3 the supporting bridges 9 transmit the full stress to the second arm 7. An increase of the load bearing power of supporting bridges 9 can be, in many cases, obtained by adding another bridge 9, which is sufficient due to the character of the stress and due to the relatively large cross-section of the supporting arms.

The supporting bridges 5 or 9 of the hub 3 and of the spur gear 8, respectively, are advantageously situated symmetrically around the circumference of the gears, particularly in case of a negative arrangement of bridges.

FIG. 5 is a partial longitudinal sectional view of a gearing mechanism in accordance with the invention as applied to a joint of a rest (back rest) of a seat. The adjustable joint comprises a tiltable side wall formed by the arm 1, connected to the frame of the back rest of the seat and provided with a crown gear 2 with internal toothing and a stable side wall formed by the arm 7 connected to the frame of the seat and provided with a spur gear 8 with external toothing. The crown gear 2 has three symmetrically arranged increased tooth gaps 4, where supporting bridges are provided, connecting the first arm 1 with the hub 3. The second arm 7 is connected with the spur gear 8, which is provided, due to the kind of stress, with four symmetrically arranged supporting bridges 9 situated at increased tooth gaps 11. The first arm 1 is supported by its opening 6 and the second arm 7 is supported by its opening 10 by a self-locking eccentric element (not shown), connected firmly with a control rosette. By turning the eccentric element, a relative rolling motion of the toothing of the crown gear with respect to the toothing of the spur gear 8 results, this producing in a change of the relative angular position of the two arms connected with said gears.

The gearing mechanism of the present invention can be employed wherein there is internal engagement between the toothings of the gears, where the gears are pressed from a single part, as for instance with tilting mechanisms for back rests of seats, of head rests, and of arrangements for lowering windows in motor vehicles, positioning mechanisms and reductors with a small transmitted force in textile machines; furthermore, in vehicles for mass transportation, childrens' vehicles, vehicles for people with reduced mobility, in the furniture industry, and in road and agricultural machines and the like.

Although the invention is described and illustrated with reference to a single preferred embodiment thereof, it is to be expressly understood that it is in no way limited to the disclosure of such preferred embodiment but is capable of numerous modifications within the scope of the appended claims.

I claim:

1. In a gearing mechanism adapted for changing the relative angular position of two arms, said mechanism including a ring gear which forms a unit with a first arm of the mechanism, a spur gear which forms a unit with a second arm of the mechanism, the spur gear having a diameter less than that of the ring gear and being positioned eccentrically therewithin in mesh with the ring gear, the improvement wherein the toothing of at least one of said ring gear and spur being provided with a row of teeth with at least one tooth gap, the width of such gap within the range of the working height of the teeth being at least equal to the pitch of the toothing measured at the same diameter, and at the location of the increased tooth gap on the first arm there being a supporting bridge for connecting the hub of the first arm to the main body of the first arm, whereby by the turning of the spur gear a relative angular displacement of the two arms is achieved.

2. Gearing mechanism according to claim 1, wherein the supporting bridge for the hub is created by the axial bending of the material of the first arm, such material remaining above the root circle of the internal toothing of the ring gear.

3. Gearing mechanism according to claim 2, wherein the spur gear has a supporting bridge. the supporting bridge of the spur gear being created by the axial bending of the material of the second arm, the material of the second arm remaining below the root circle of the external toothing of the spur gear.

* * * * *